United States Patent [19]
Okamoto

[11] Patent Number: 6,040,073
[45] Date of Patent: Mar. 21, 2000

[54] FUEL CELL

[75] Inventor: Takafumi Okamoto, Koshigaya, Japan

[73] Assignee: Honda Giken Kogyo Kabushiki Kaisha, Tokyo, Japan

[21] Appl. No.: 08/908,154

[22] Filed: Aug. 6, 1997

[30]     Foreign Application Priority Data

Aug. 7, 1996 [JP] Japan .................................. 8-208512

[51] Int. Cl.$^7$ ................................................ H01M 8/04
[52] U.S. Cl. ........................................................ 429/26
[58] Field of Search ........................................ 429/24, 26

[56]            References Cited

U.S. PATENT DOCUMENTS

| 3,945,844 | 3/1976 | Nickols ........................................ 429/26 |
| 4,824,740 | 4/1989 | Abrams et al. ............................ 429/24 |

FOREIGN PATENT DOCUMENTS 0 741 428 A1  11/1996  European Pat. Off. .

OTHER PUBLICATIONS

Patent Abstract of JP 07169489 (Jul. 1995).
Patent Abstract of JP 62297912 (Dec. 1987).
Patent Abstract of JP 08195214 (Jul. 1996).
Patent Abstract of JP 07226223 (Aug. 1995).
European Search Report (Jan. 1998).

*Primary Examiner*—Stephen Kalafut
*Attorney, Agent, or Firm*—Lyon & Lyon LLP

[57]             ABSTRACT

A fuel cell unit in which a hydrogen-side (anode) electrode and an air-side (cathode) electrode are disposed in facing relation to each other with an electrolyte membrane interposed therebetween, and wherein a separator is provided for supporting said fuel cell structure interposed therebetween. The separator has, independently disposed therein, a first cooling passage through which a first cooling medium, generally composed of water, is introduced for cooling the hydrogen-side electrode, and a second cooling passage through which a second cooling medium having a melting point below that of water is introduced for cooling the air-side electrode. Accordingly, a melting operation for the first cooling medium can be easily and swiftly carried out, while the fuel cell unit itself remains simple in structure.

23 Claims, 7 Drawing Sheets

FUEL CELL

BACKGROUND OF THE INVENTION

1. Field of the Invention

The present invention is directed to a fuel cell structure in which an anode electrode and a cathode electrode are disposed in facing relation to each other with an electrolyte membrane interposed therebetween, and wherein a separator is provided for supporting the fuel cell structure interposed therebetween.

2. Description of the Related Art

There have been developed fuel cells comprising, for example, a plurality of stacked fuel cell units each having an anode and a cathode provided in opposing relation with an electrolyte membrane sandwiched therebetween, the fuel cell units further being interposed between separators. Such fuel cells are being put to practical use in a variety of applications.

Such types of fuel cells, for example, are structured such that a hydrogen gas (i.e. a fuel gas) which is generated by a methanol vapor reforming is supplied to a anode electrode, and an oxygen-containing gas (air) is supplied to a cathode electrode, whereby the hydrogen gas becomes ionized and flows through a solid polymer electrolyte membrane, thereby generating electrical energy out of the fuel cell.

In this case, in order that efficient generation of electrical power from the fuel cell can be exhibited, it is necessary to cool the anode and cathode electrodes of the fuel cell. For this purpose, for example, a structure wherein conduits for cooling water are provided in the separators, and wherein cooling water is supplied through said conduits, has been widely employed.

However, with the fuel cell having the structure described above, a problem has arisen in that when the fuel cell is used in especially cold regions, the cooling water in the fuel cell can become frozen. As a result, prior to initiating operation of the fuel cell, it becomes necessary to undertake an operation for melting the frozen cooling water, and such an operation is both troublesome and time consuming.

SUMMARY OF THE INVENTION

The present invention has the object of addressing and solving the aforementioned problems, wherein a melting operation for melting a cooling medium can be easily and swiftly carried out, yet while offering a fuel cell having a simplified structure.

In order to address these problems, it is an object of the present invention to provide a fuel cell, in which there are respectively disposed within a separator structure, a first cooling conduit through which a first cooling medium is introduced for cooling an anode electrode side, and a second cooling conduit through which a second cooling medium is introduced for cooling a cathode electrode side of the fuel cell. And further, wherein one of the first cooling medium and the second cooling medium has a lower melting point than the other cooling medium. For example, the first cooling medium can comprise water, and the second cooling medium is a substance having a melting point below that of water.

Accordingly, when water becomes frozen in the first cooling conduit, the second cooling medium having a melting point below that of water, in a non-frozen state, is caused to flow through the second cooling conduit, and thereby, heat exchange is conducted between the second cooling medium and the water, so that the frozen water can be easily melted. Notwithstanding, the overall structure of the fuel cell can remain simple and efficient.

In the present invention, when freezing of the water is detected, the second cooling medium is heated via a heating means, and a melting operation for melting the frozen water is even more quickly and reliably accomplished. The water freezing detection can be performed using a pressure meter for detecting water pressure and/or a flow rate meter for detecting the flow rate of the water.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Figure 1:
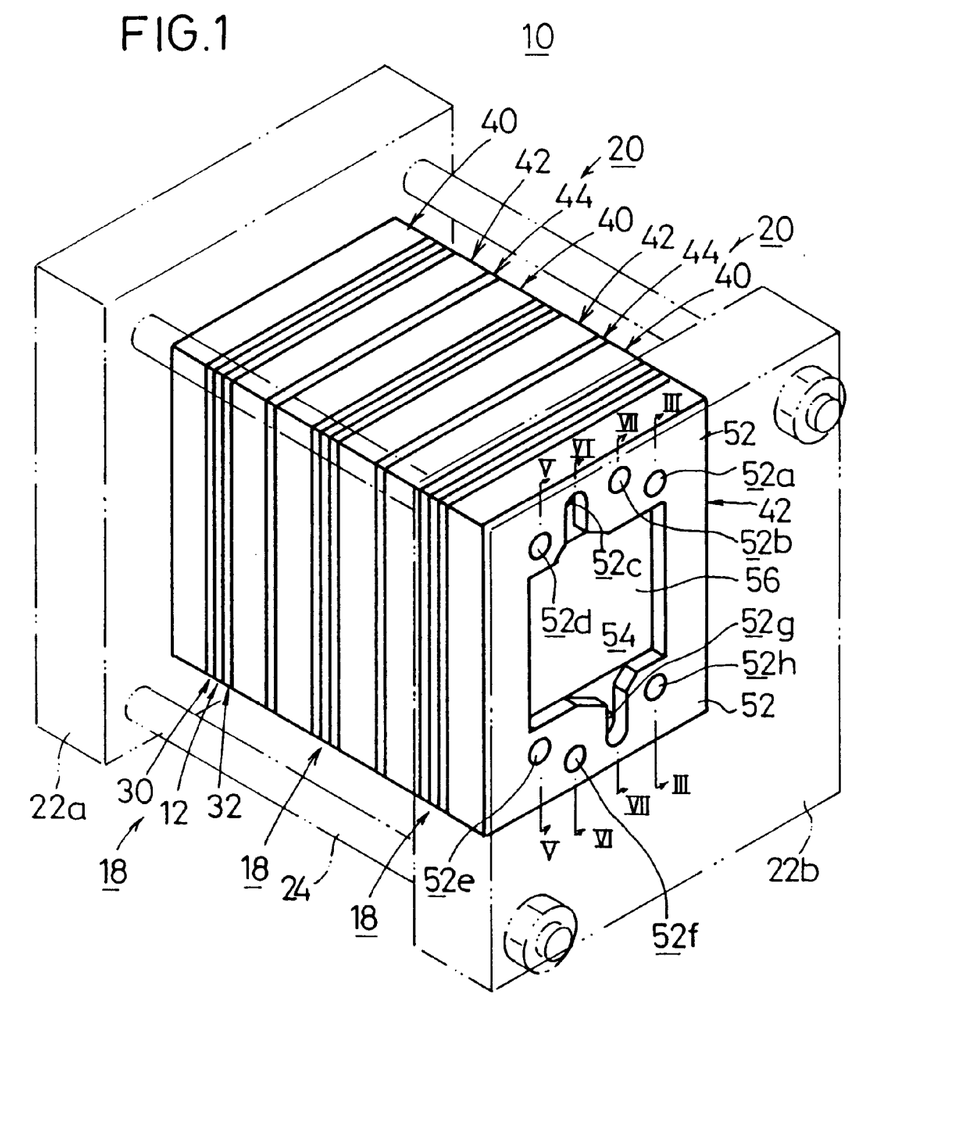
FIG. 1 illustrates, in an outline perspective view, an embodiment of the fuel cell according to the present invention.
Figure 2:
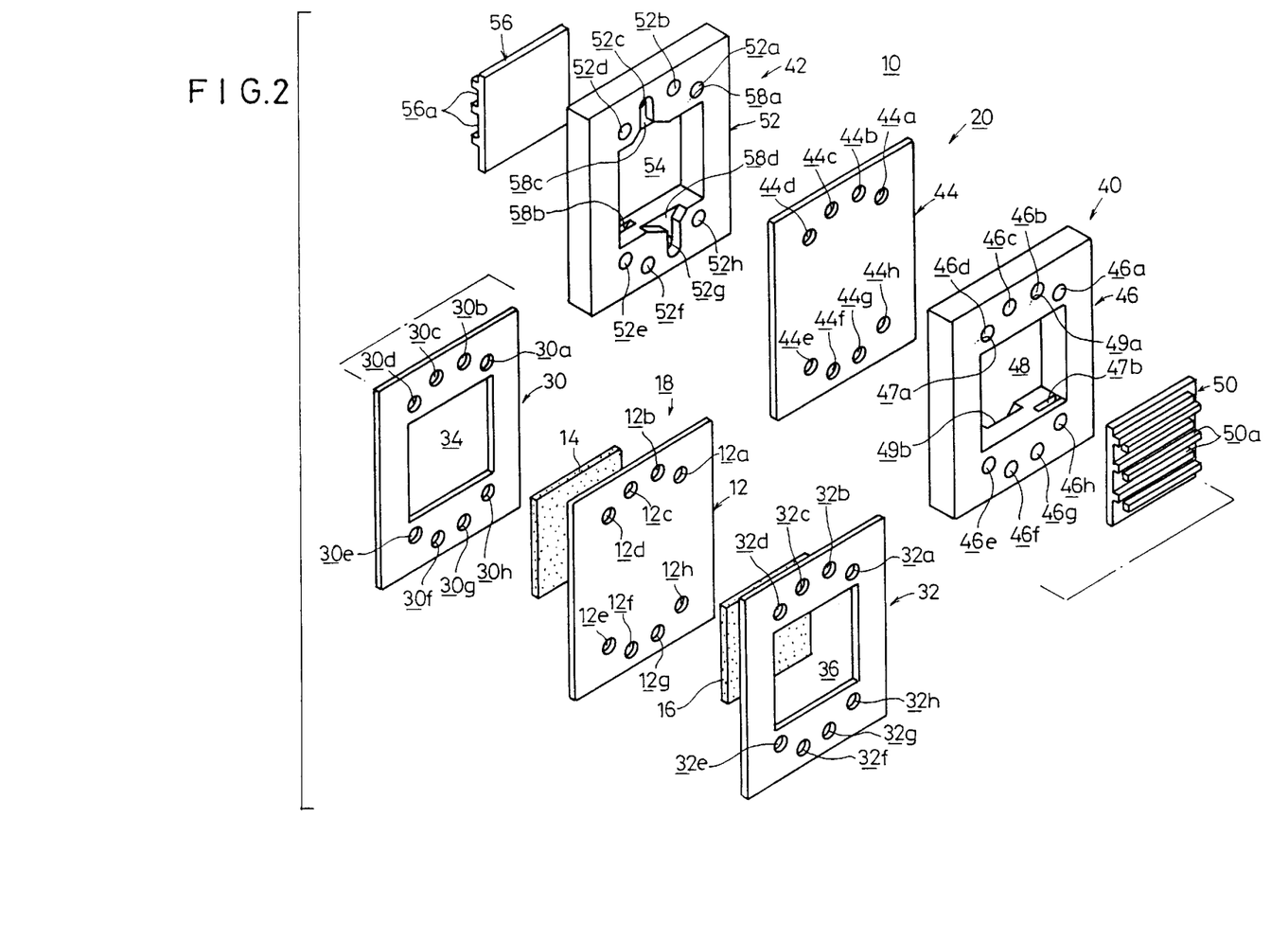
FIG. 2 illustrates an exploded perspective view of one part of the fuel cell shown in FIG. 1.

FIG. 1 illustrates, in an outline perspective view, an embodiment of the fuel cell according to the present invention, whereas FIG. 2 shows an exploded perspective view of one part of the fuel cell shown in FIG. 1.

A fuel cell 10 is made up of fuel cell unit 18 comprising an air-side (cathode) electrode 14 and a hydrogen-side (anode) electrode 16 which are disposed in confronting relation to each other and having sandwiched therebetween a solid polymer electrolyte membrane 12, together with separators 20 which support in sandwiched relation therebetween a plurality of such fuel cell units 18. The fuel cell units 18 and separators 20 are fixed together unitarily by opposing end plates 22a, 22b and four tie rods 24.

As shown in FIG. 2, the upper side of the electrolyte membrane 12 has disposed therein a fuel gas inlet hole 12a, an air-side electrode cooling medium (second cooling medium) discharge hole 12b, a cooling water (first cooling medium) discharge hole 12c and an oxygen-containing gas inlet hole 12d. The lower part of the electrolyte membrane has disposed therein a fuel gas discharge hole 12e, an air-side electrode cooling medium inlet hole 12f, a cooling water inlet hole 12g and an oxidizing gas discharge hole 12h.

On both sides of the fuel cell unit 18 are arranged a first gasket 30 and a second gasket 32. The first gasket 30 includes a large opening 34 for accommodating the air-side electrode 14, and the second gasket 32 has a large opening 36 therein for accommodating the hydrogen-side electrode 16. The first and second gaskets 30, 32 have respectively disposed at an upper portion thereof, fuel gas introduction holes 30a, 32a, air-side electrode cooling medium discharge holes 30b, 32b, cooling water discharge holes 30c, 32c and oxygen-containing gas inlet holes 30d, 32d. In addition, respectively disposed on a lower portion thereof are fuel gas discharge holes 30e, 32e, air-side electrode cooling medium inlet holes 30f, 32f, cooling water inlet holes 30g, 32g and oxygen-containing gas discharge holes 30h, 32h.

The separators 20 are made up of a first air-side electrode separator part 40, a second hydrogen-side electrode separator 42, and a partition plate 44 which is sandwiched between the first and second separator parts 40, 42.

A first manifold plate 46 which makes up part of the first separator part 40, is constructed as a rectangular flat plate, wherein in a middle portion thereof, a large opening 48 is provided. On the upper side of the first manifold plate 46 are disposed a fuel gas inlet hole 46a, an air-side electrode cooling medium discharge hole 46b, a cooling water discharge hole 46c, and a oxygen-containing gas inlet hole 46d. On the lower side of the first manifold plate 46 are disposed a fuel gas outlet hole 46e, an air-side electrode cooling medium inlet hole 46f, a cooling water inlet hole 46g and an oxygen-containing gas discharge hole 46h. Recesses 47a, 47b which are disposed in the first manifold plate 46 offset from the air-side electrode 14 communicate with the two holes 46d and 46h which are disposed in positions mutually angularly opposed from one another. The recesses 47a, 47b further communicate with each other through the opening 48 (see FIG. 3 and FIG. 5).

An oxygen-containing gas flow control plate 50 (cathode-side element) is fitted in the opening 48 of the first manifold plate. The oxygen-containing gas flow control plate 50 has one side thereof which is flat, and the other side has serpentine pathways 50a formed thereon, the serpentine pathways providing communication between the hole 46d and the hole 46h. The oxygen-containing gas flow control plate 50 is formed from a dense material, and more specifically can be made from graphite-carbon, stainless steel, or conductive metals having corrosion resistant properties, such as the nickel alloy Inconel (trademark), other nickel alloys, or further from conductive rubber or conductive resins.

Figure 6:
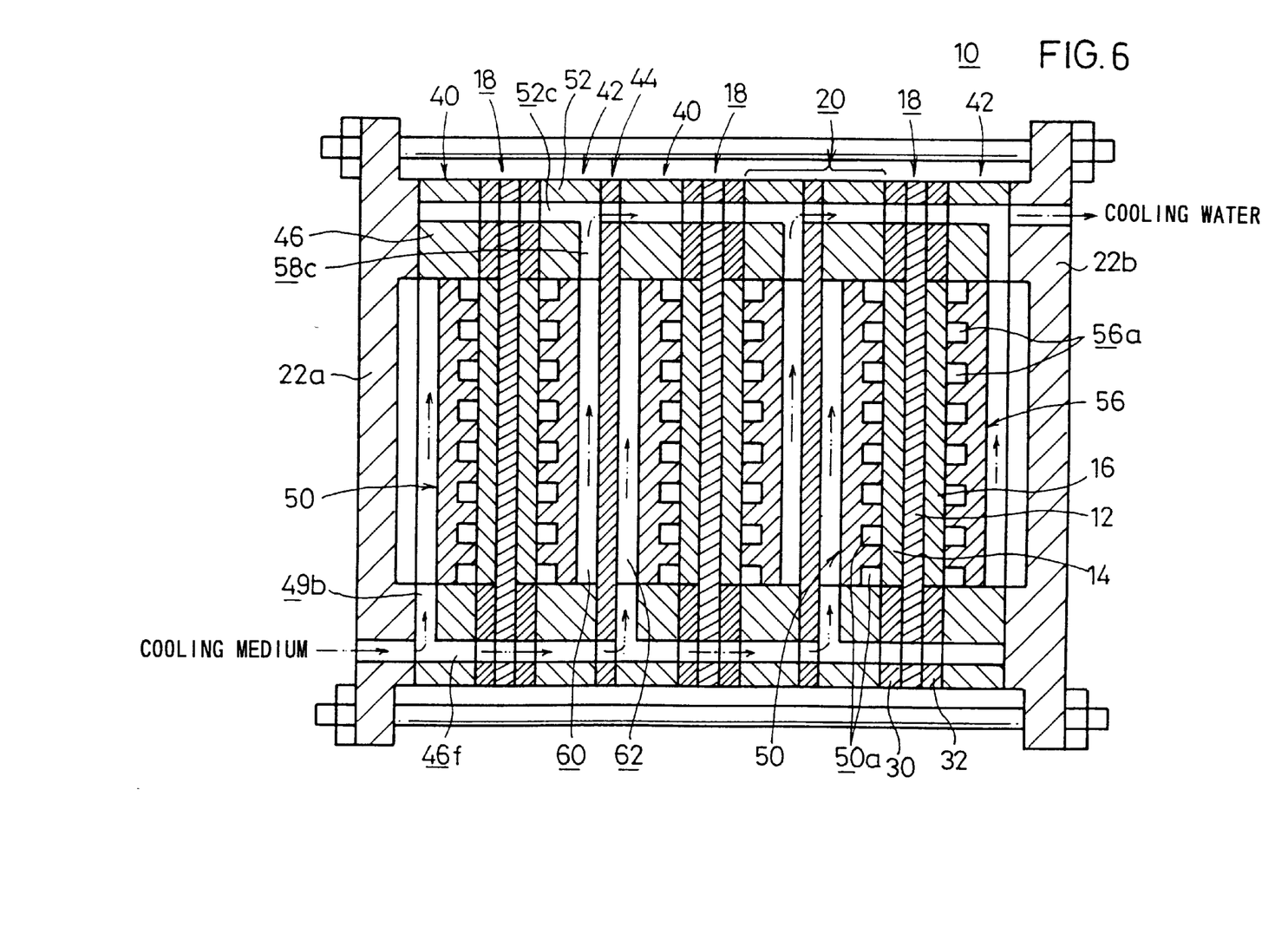
FIG. 6 is a sectional plan view taken along line VI—VI in FIG. 1.
Figure 7:
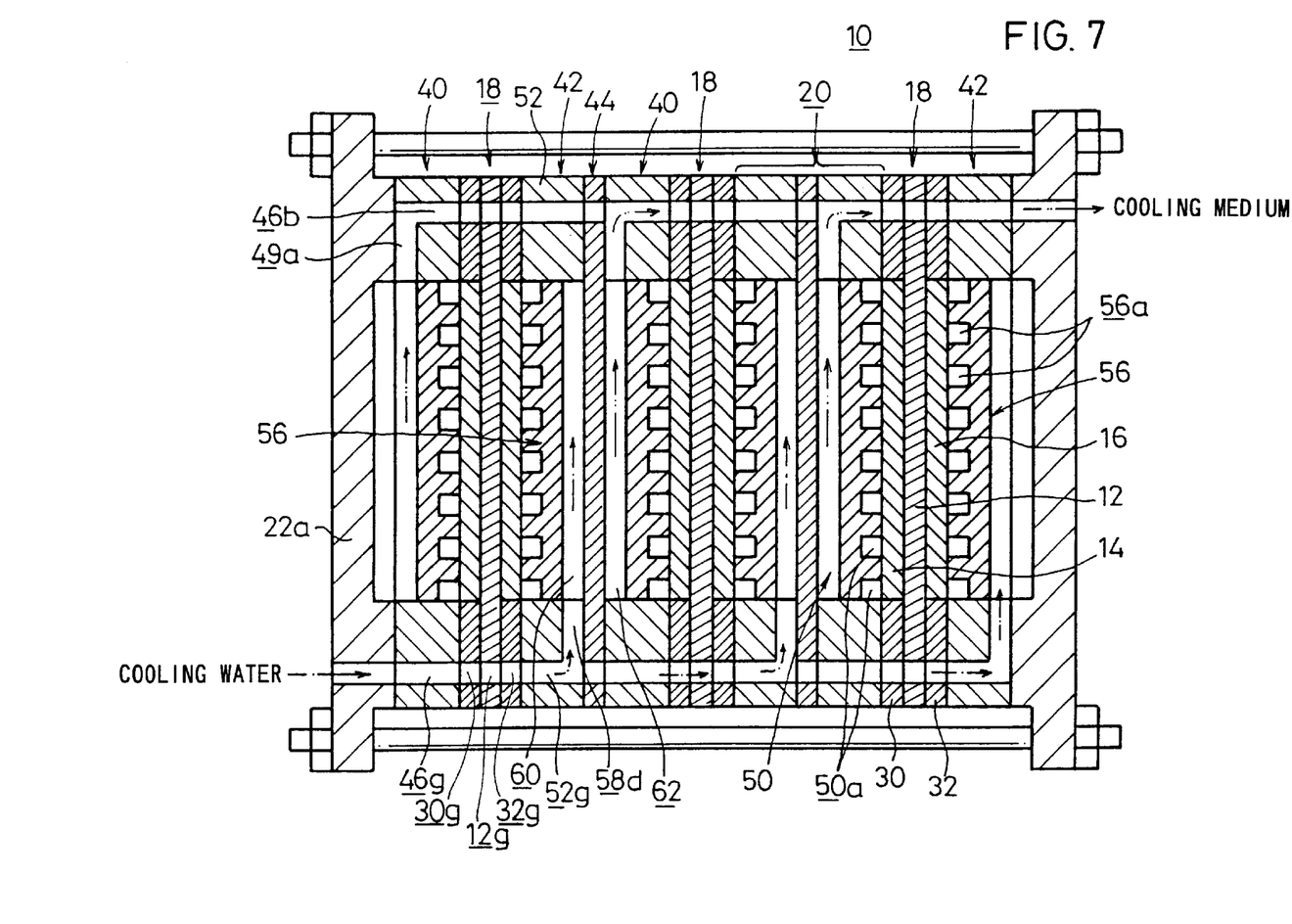
FIG. 7 is a sectional plan view taken along line VII—VII in FIG. 1.

The holes 46b, 46f of the first manifold plate 46 are positioned offset from the second separator part 42 side, and intercommunicate with each other through the recesses 49a, 49b and the opening 48 (see FIG. 6 and FIG. 7).

The second separator part 42 is constructed in similar fashion as the first separator part 40, and the second manifold plate 52 includes a fuel gas flow control plate (anode-side element) 56 fitted into the opening 54 of the second manifold plate 52.

On the upper portion of the manifold plate 52 are disposed a fuel gas inlet hole 52a, an air-side electrode cooling medium discharge hole 52b, a cooling water discharge hole 52c, and a oxygen-containing gas inlet hole 52d, whereas on the lower portion thereof are disposed a fuel gas discharge hole 52e, and air-side electrode cooling medium inlet hole 52f, a cooling water inlet hole 52g, and a oxygen-containing gas discharge hole 52h. Holes 52a and 52e communicate through recesses 58a, 58b (see FIG. 3 and FIG. 5), and in addition, holes 52c and 52g communicate with the opening 54 through recesses 58c, 58d (see FIG. 6 and FIG. 7).

The fuel gas flow control plate 56 is flat on one side thereof, while on the other surface thereof is formed with a serpentine pathway 56a. In order that water (the first cooling medium) which is supplied to the flat side of the control plate 56 can further be supplied to the hydrogen electrode 16, the fuel gas flow control plate 56 is formed from a conductive water-permeable material, and more specifically, may be constructed of porous sintered carbon, a conductive porous sintered metal, porous conductive rubber, a porous conductive resin, or other various porous materials, or composites thereof. If the fuel gas flow control plate 56 is formed of porous sintered carbon, it is preferable that the plate have a porosity of less than 70% and a pore size of less than 40 $\mu$m, so that dripping of water is prevented.

Further, the fuel gas flow control plate 56 ideally should be constructed as a porous body which has been made water repellant to improve durability. In this case, the fuel gas flow control plate 56 is subjected to a water repellant treatment, for example, by immersing the flow control plate in a dispersion solution of PTFE (polytetrafluoroethylene) adjusted at a predetermined concentration, and then drying at room temperature, followed by firing at 300 to 380 °C.

The partition plate 44 is composed of dense and conductive graphite carbon, stainless steel, a conductive metal having a corrosion resistance such as a nickel alloy, conductive rubber, conductive resin, or composites thereof. The partition plate 44, at an upper portion thereof, is provided with a fuel gas inlet hole 44a, an air-side electrode cooling medium discharge hole 44b, a cooling water discharge hole 44c and an oxygen-containing gas inlet hole 44d. On the lower portion of the partition plate 44, there are disposed a fuel gas discharge hole 44e, an air-side electrode cooling medium inlet hole 44f, a cooling water inlet hole 44g and an oxygen-containing gas discharge hole 44h.

Figure 3:
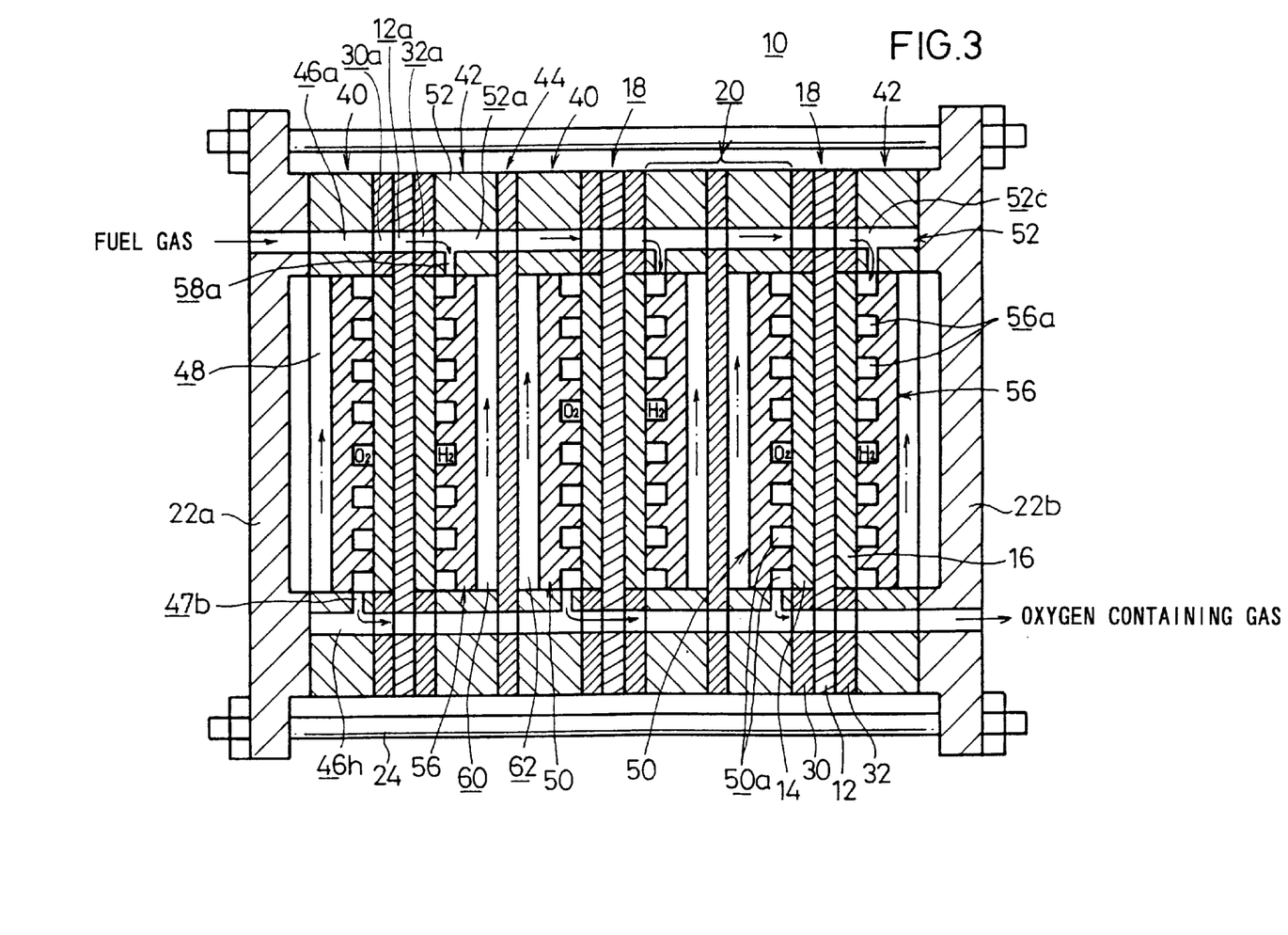
FIG. 3 is a sectional plan view taken along line III—III in FIG. 1.

As shown in FIG. 3, the separator 20 has a first passage 60 for introducing cooling water for cooling the hydrogen-electrode 16 side between the partition plate 44 and the fuel gas flow control plate 56. In addition, a second cooling passage 62 is disposed for introducing a second cooling medium for cooling the air-side electrode 14 between the partition plate 44 and the oxygen-containing gas flow control plate 50.

The first and second cooling passages 60, 62 are respectively independent, wherein the first cooling medium, i.e. water, is supplied through the first cooling passage 60, and the second cooling medium, having a melting point below that of the first cooling medium, is supplied through the second cooling passage.

As for the second cooling medium, in particular, any of the following may be used, wherein the respective melting temperatures, under ordinary pressure are shown in parenthesis: methanol (−97.78 °C.), ethanol (−114.5 °C.), propanol (−127° C.), isopropanol (−89.5° C.), 1-butanol (−89.53° C.), 2-methyl-1-propanol (−108° C.), 2-butanol (−114.7° C.), 1-hexanol (−44.6° C.), 1-octanol (−14.9° C.), 2-ethyl-hexanol (−76° C.), methane (−182.48° C.), ethane (−183.6° C.), propane (−187.69° C.), ethylene-glycol (−12.6° C.), propylene-glycol (−60° C.), ethyl-ether (−116.3° C.), toluene (−95° C.), ammonia (−77.7° C.), methylamine (−93.46° C.), and ethylamine (−81° C.).

Figure 4:
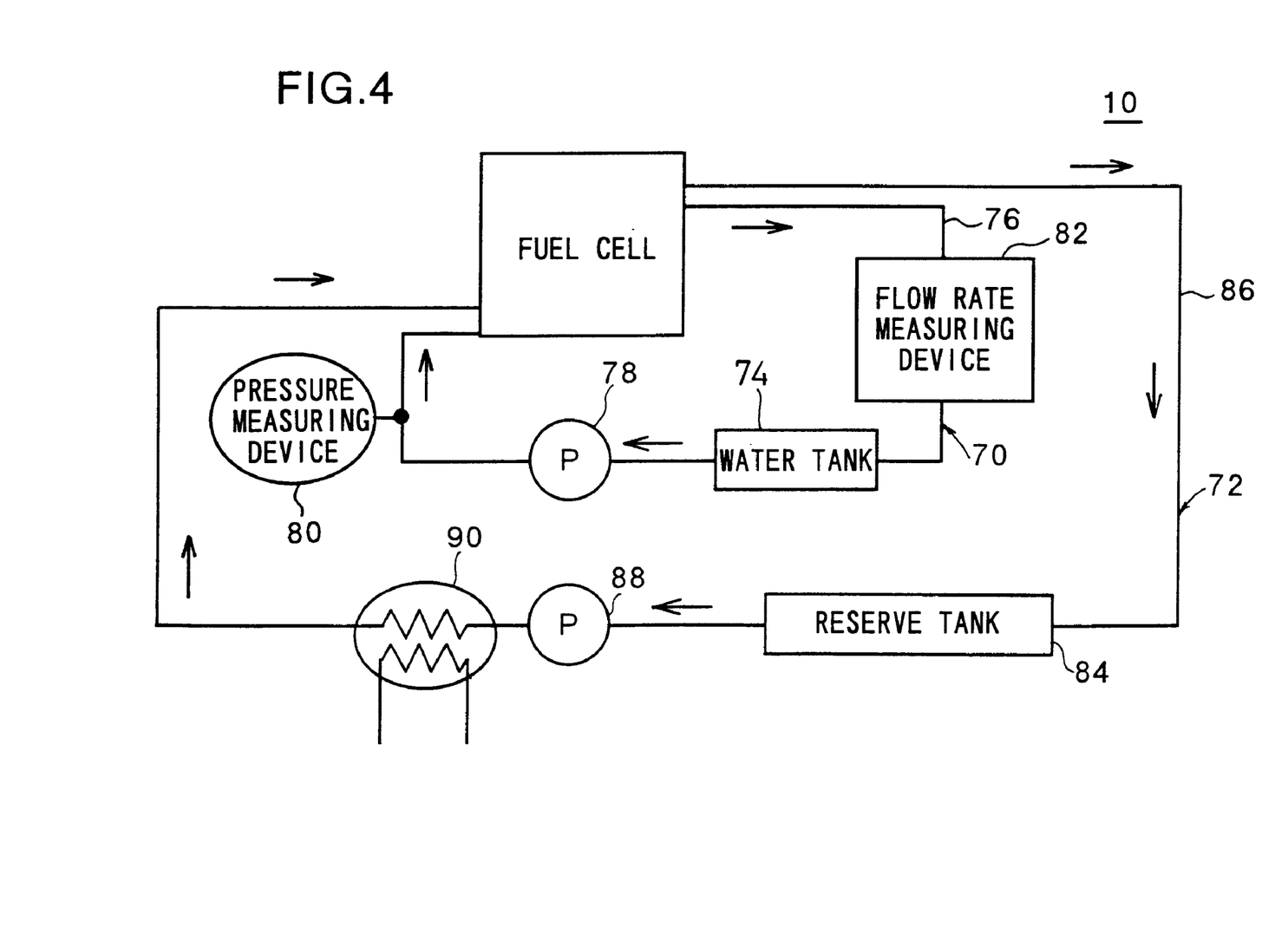
FIG. 4 is an explanatory outline of the circulatory routes through which the first and second cooling mediums are circulated.

As shown in FIG. 4, the fuel cell is arranged with a first circulatory route 70 for circulating the first cooling medium comprised of water to the first cooling passage 60, and a second circulatory route circuit 72 for circulating the second cooling medium to the second cooling passage 62.

The first circulatory route 70 has arranged therein a water tank 74, wherein the water tank 74 communicates with the fuel cell through the first circulatory passage 76. In the first circulatory passage 76, a circulating pump 78 for supplying water to the fuel cell from the water tank 74, a pressure measuring device 80 for detecting water pressure, and a flow rate measuring device 82 for detecting flow rate are disposed. The pressure measuring device 80 and/or the flow rate measuring device 82 serve as a freezing detection means for detecting a frozen state of the water.

The second circulatory route 72 has arranged therein a reserve tank 84 for the second cooling medium, wherein the reserve tank 84 and the fuel cell 10 communicate with each other through a second circulatory passage 86. In the second circulatory passage 86, a circulating pump 88 for a low melting point cooling medium, for supplying the second cooling medium to the fuel cell 10 from the reserve tank 84, and a heat transfer device (heating means) 90 for supplying heat to the second cooling medium, for the purpose of melting the water when it is detected that the water is in a frozen state, are respectively disposed.

A description of the operation of the fuel cell 10, constructed as indicated above, shall now be given.

As shown in FIG. 3, when the fuel gas (hydrogen gas) is supplied to the fuel cell 10, the fuel gas passes through the hole 46*a* of the first manifold plate 46 of the first separator part 40, and holes 30*a*, 12*a* and 32*a* of the fuel cell unit 18, to reach the hole 52*a* of the second manifold plate 52 of the second separator part 42. The fuel gas then flows from the hole 52*a* and recess 58*a* through the passage 56*a* of the fuel gas flow control plate 56, and is supplied to the hydrogen electrode 16 of the fuel cell unit, and then is discharged through the recess 58*b*.

Figure 5:
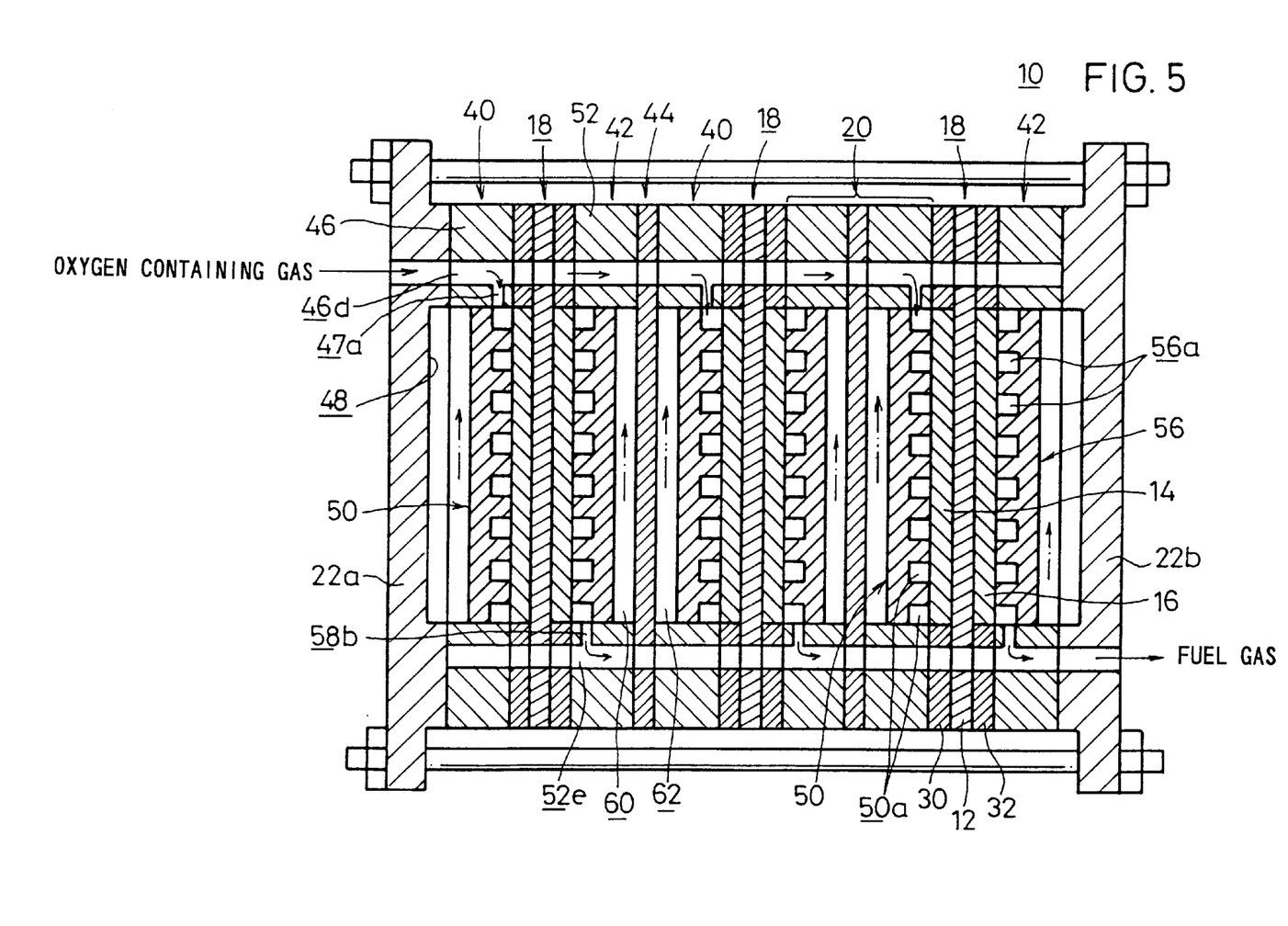
FIG. 5 is a sectional plan view taken along line V—V in FIG. 1.

As shown in FIG. 5, the oxygen-containing gas is supplied through the hole 46*d* of the first manifold plate 46, and is introduced into the passage 50*a* of the oxygen-containing gas flow control plate 50 from hole 46*d* and recess 47*a*, and therefrom is supplied to the air-side electrode 14 of the fuel cell unit 18. Further, any unused oxygen-containing gas, as shown in FIG. 3, is discharged to the outside through the hole 46*h* of the first manifold plate 46, and any unused fuel gas, as shown in. FIG. 5, is discharged to the outside through the hole 52*e* of the second manifold plate 52.

On the other hand, the first cooling medium composed of water, as shown in FIG. 4, is supplied to the fuel cell 10 from the water tank 74 and via the first circulatory passage 76 under operation of the pump 78. The water, as shown in FIG. 7, reaches the hole 52*g* of the second separator part 42 from the hole 46*g* of the first separator part 40, and the holes 30*g*, 12*g* and 32*g* of the fuel cell unit 18, and from the recess 58 which communicates with the hole 52*g*, is introduced to the partition plate 44 and the fuel gas flow control plate 56, or in other words, to the first cooling passage 60, and flows in a direction from the bottom to the top of the cooling passage 60.

At this time, since the fuel gas flow control plate 56 is formed of a water permeable material (porous body), the water which is introduced through the first cooling passage 60 permeates the fuel gas flow control plate 56, and can thereby directly humidify the fuel gas supplied through the passage 56*a* and the hydrogen electrode 16.

Furthermore, the second cooling medium, as shown in FIG. 4, is supplied to the fuel cell 10 from the reserve tank 84 through the second circulatory passage 86 under operation of the pump 88. As shown in FIG. 6, the second cooling medium is supplied to the hole 46*f* of the first separator part 40, and from the recess 49 which communicates therewith, is introduced in a direction from the bottom to the top of the second cooling passage 62 of the separator 20. As shown in FIG. 7, the second cooling medium is returned to the second circulatory passage 86 through the hole 46*b* of the first manifold plate 46, whereas the water which is introduced into the first cooling passage, as shown in FIG. 6, is returned to the first circulatory passage 76 through the recess 58*c* of the second manifold plate 52.

Incidentally, when the fuel cell 10 is employed in regions having cold climates, there is a tendency for the first cooling medium composed of water in the interior of the fuel cell 10 to become frozen. To cope with this difficulty, the present embodiment employs, in the separator, a first cooling passage 60 through which the first cooling medium is introduced, and a second cooling passage 62 through which the second cooling medium is introduced, wherein the second cooling medium is a substance having a lower melting point than the first cooling medium which is generally composed of water.

As a result of this arrangement, even if the water becomes frozen, because the second cooling medium remains in an unfrozen state and flows through the second cooling passage 62, heat exchange occurs across the partition plate 44 which is sandwiched between the frozen water and the second cooling medium. Accordingly, with this simple structure, the frozen water can be easily melted.

Still further, with the present embodiment as shown in FIG. 4, first and second circulatory routes 70 and 72 are provided. Thereby, when a frozen condition of the water is generated in the fuel cell, an indicated pressure value from the pressure measuring device 80 disposed in the first circulatory route 70 becomes greater than a predetermined value, together with the flow rate meter 82 no longer detecting a water flow, so that the frozen condition of the water can be automatically detected.

At this time, based on the detection result from the pressure measuring device and/or the flow rate measuring device, the heat exchange device 90 disposed in the second circulatory route 72 is operated. Accordingly, the second cooling medium which is supplied to the fuel cell 10 through the second ciruculatory passage is heated by the heat exchange device 90, and water which is frozen inside the fuel cell 10 can be quickly and reliably melted.

As set forth and described above, in the fuel cell according to the present invention, when a first cooling medium which is generally composed of water becomes frozen in the first cooling path of the separator, a second cooling medium having a lower melting point than water flows through the second cooling path in an unfrozen state, and thereby heat exchange is conducted with the water. As a result, with a simple structure, the water can be easily and efficiently melted.

What is claimed is:

1. A fuel cell comprising:
   a plurality of fuel cell units with each fuel cell unit comprising an anode electrode and a cathode electrode facing each other with an electrolyte membrane interposed therebetween;
   a separator interposed between adjacent fuel cell units; and
   wherein said separator comprises, respectively disposed therein, a first cooling path through which a first cooling medium is passed for cooling said anode electrode side, and a second cooling path through which a second cooling medium is passed for cooling said cathode electrode side; and
   wherein one of said first cooling medium and said second cooling medium has a lower melting point than the other cooling medium.

2. The fuel cell according to claim 1, wherein said first cooling medium for cooling said anode electrode side is water, and wherein said second cooling medium for cooling said cathode electrode side is a substance having a melting point below that of water.

3. The fuel cell according to claim 2, wherein said substance having a melting point below that of water is selected from the group of methanol, ethanol, propanol, isopropanol, 1-butanol, 2-methyl-1-propanol, 2-butanol, 1-hexanol, 1-octanol,2-ethyl-hexanol, methane, ethane, propane, ethylene-glycol, propylene-glycol, ethyl-ether, toluene, ammonia, methylamine, and ethylamine.

4. The fuel cell according to claim 2, further comprising:
a first circulatory route for circulating said water to said first cooling path; and
a second circulatory route for circulating said second cooling medium to said second cooling path,
wherein said first circulatory route includes a freezing detection means for detecting whether said water has frozen, and said second circulatory route includes a heating means for conveying heat to said second cooling medium for the purpose of melting said water, when said freezing detection means detects that said water has become frozen.

5. The fuel cell according to claim 4, wherein said freezing detection means comprising a pressure measurement means for detecting water pressure in said first circulatory route and/or flow measurement means for detecting a rate of flow through said first circulatory route.

6. A fuel cell comprising a plurality of fuel cell units having an anode part and a cathode part, and a separator structure between adjacent fuel cell units, said separator structure having a first cooling path through which a first cooling medium flows for cooling said anode part and a second cooling path through which a second cooling medium flows for cooling said cathode part, wherein one of said first cooling medium and said second cooling medium has a lower melting point than the other cooling medium.

7. The fuel cell according to claim 6, wherein one of said first cooling medium and said second cooling medium is water and the other is a substance having a melting point below that of water.

8. The fuel cell according to claim 7, wherein said first cooling medium for cooling said anode part is water, and wherein said second cooling medium for cooling said cathode part is a substance having a melting point below that of water.

9. The fuel cell according to claim 7, wherein said substance having a melting point below that of water is selected from the group of methanol, ethanol, propanol, isopropanol, 1-butanol, 2-methyl-1-propanol, 2-butanol, 1-hexanol, 1-octanol, 2-ethyl-hexanol, methane, ethane, propane, ethylene-glycol, propylene-glycol, ethyl-ether, toluene, ammonia, methylamine, and ethylamine.

10. The fuel cell according to claim 6, further comprising:
a first circulatory route for circulating said first cooling medium via said first cooling path; and
a second circulatory route for circulating said second cooling medium via said second cooling path,
wherein said first circulatory route includes a freezing detection means for detecting whether said first cooling medium is frozen, and said second circulatory route includes a heating means for conveying heat to said second cooling medium for the purpose of melting said first cooling medium, when said freezing detection means detects that said first cooling medium is frozen.

11. The fuel cell according to claim 10, wherein said freezing detection means comprises a pressure measurement means for detecting pressure in said first circulatory route and/or flow measurement means for detecting a rate of flow through said first circulatory route.

12. A fuel cell comprising:
a fuel cell unit comprising an anode electrode and cathode electrode facing each other with an electrolyte membrane interposed therebetween;
a first cooling path through which a first cooling medium is passed for cooling said anode electrode;
a second cooling path through which a second cooling medium is passed for cooling said cathode electrode; and
one of said first cooling medium and said second cooling medium having a lower melting point than the other cooling medium.

13. The fuel cell according to claim 12, wherein said first cooling medium for cooling said anode electrode is water, and wherein said second cooling medium for cooling said cathode electrode has a melting point below that of water.

14. The fuel cell according to claim 12, wherein a plurality of fuel cell units are mounted in adjacent relationship with a partition plate between each pair of adjacent fuel cell units, each said partition plate separating said first cooling path from said second cooling path.

15. The fuel cell according to claim 13, wherein said second cooling medium is selected from the group of methanol, ethanol, propanol, isopropanol, 1-butanol, 2-methyl-1-propanol, 2-butanol, 1-hexanol, 1-octanol, 2-ethyl-hexanol, methane, ethane, propane, ethylene-glycol, propylene-glycol, ethyl-ether, toluene, ammonia, methylamine, and ethylamine.

16. The fuel cell according to claim 12, further comprising:
a first circulatory route for circulating said first cooling medium through said first cooling path; and
a second circulatory route for circulating said second cooling medium through said second cooling path,
at least a portion of said first cooling path being in heat exchange relationship with at least a portion of said second cooling path,
wherein said first circulatory route includes a freezing detection means for detecting whether said first cooling medium has frozen, and said second circulatory route includes a heating means for conveying heat to said second cooling medium for the purpose of melting said first cooling medium when said freezing detection means detects that said first cooling medium has become frozen.

17. The fuel cell according to claim 16, wherein said freezing detection means comprises at least one of a pressure measurement means for detecting water pressure in said first circulatory route and a flow measurement means for detecting a rate of flow through said first circulatory route.

18. A fuel cell comprising:
a fuel cell unit having an anode electrode and a cathode electrode facing each other with an electrolyte membrane interposed therebetween;
a first gas flow control plate adjacent said anode electrode on a side opposite said membrane;
a second gas flow control plate adjacent said cathode electrode on a side opposite said membrane;
a first cooling path through which a first cooling medium is passed for cooling said first gas flow control plate and said anode electrode;

a second cooling path through which a second cooling medium is passed for cooling said second gas flow control plate and said cathode electrode; and one of said first cooling medium and said second cooling medium having a lower melting point than the other cooling medium.

19. The fuel cell according to claim 18, wherein said first cooling medium for cooling said first gas flow control plate and said anode electrode is water, and wherein said second cooling medium for cooling said second gas flow control plate and said cathode electrode has a melting point below that of water.

20. The fuel cell according to claim 18, wherein a plurality of fuel cell units are mounted in adjacent relationship with a partition plate between each pair of adjacent fuel cell units, each said partition plate separating said first cooling path from said second cooling path.

21. The fuel cell according to claim 19, wherein said second cooling medium is selected from the group of methanol, ethanol, propanol, isopropanol, 1-butanol, 2-methyl-1-propanol, 2-butanol, 1-hexanol, 1-octanol, 2-ethyl-hexanol, methane, ethane, propane, ethylene-glycol, propylene-glycol, ethyl-ether, toluene, ammonia, methylamine, and ethylamine.

22. The fuel cell according to claim 19, further comprising:

a first circulatory route for circulating said first cooling medium through said first cooling path; and a second circulatory route for circulating said second cooling medium through said second cooling path, at least a portion of said first cooling path being in heat exchange relationship with at least a portion of said second cooling path, wherein said first circulatory route includes a freezing detection means for detecting whether said first cooling medium has frozen, and said second circulatory route includes a heating means for conveying heat to said second cooling medium for the purpose of melting said first cooling medium when said freezing detection means detects that said first cooling medium has become frozen.

23. The fuel cell according to claim 22, wherein said freezing detection means comprises at least one of a pressure measurement means for detecting water pressure in said first circulatory route and a flow measurement means for detecting a rate of flow through said first circulatory route.

* * * * *